Figures 1, 2, 3:
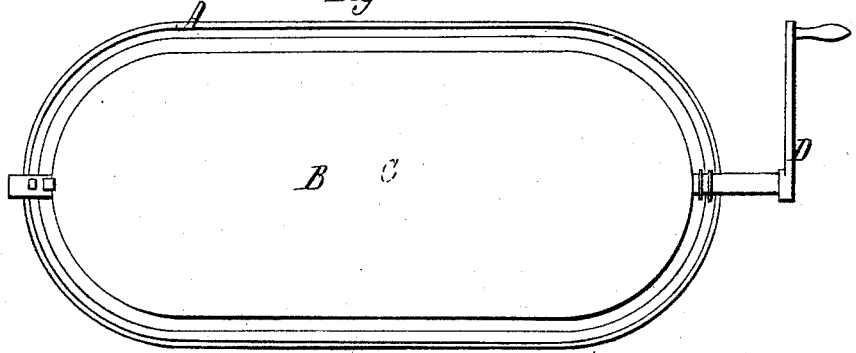

T. Joyce.
Coffee Roaster.

Nº 36,958. Patented Nov. 18, 1862.

Witnesses:
G. H. Babcock
Henry B. Ryder

Inventor:
Thos Joyce

UNITED STATES PATENT OFFICE.

THOMAS JOYCE, OF BROOKLYN, NEW YORK.

IMPROVEMENT IN COFFEE-ROASTERS.

Specification forming part of Letters Patent No. 36,958, dated November 18, 1862.

*To all whom it may concern:*

Be it known that I, THOMAS JOYCE, of Brooklyn, in the county of Kings and State of New York, have invented a certain new and Combined Coffee-Roaster and Revolving Griddle; and I do hereby declare that the following is a full and exact description of the same, reference being had to the accompanying drawings, making part of this specification, in which—

Figure 1 is a plan view. Fig. 2 is a cross-section, and Fig. 3 is a longitudinal section of a portion.

To enable others skilled in the art to make and use my invention, I will proceed to describe the construction and operation of the same by the aid of the drawings and the letters of reference marked thereon.

A is a frame or casting fitted to rest upon the top of a stove and support the revolving griddle or roaster. This latter is made in two parts, B C, hinged together at one end, as shown in Fig. 3. These parts B and C are shallow pans with flat or plain bottoms and slightly-flaring sides, as represented, and when placed together form a flat thin inclosed vessel with trunnions, which fit in proper bearings in A, and admit of the whole being rotated by means of a crank, D, placed on one end. The half of the trunnions being on each part B and C, the crank binds them together, but when it is removed they may be opened to receive the coffee or dough. A cover, F, serves to inclose the whole, as represented.

I am aware that waffle-irons, gridirons, and cylindrical and spherical coffee-roasters have been made to rotate and open in a similar manner to my invention, and I claim nothing new in such arrangement or fitting; but my invention has these peculiar qualities and advantages. It is a thin flat vessel exposing a large amount of surface to the action of the fire, and by virtue of this quality it causes the contained coffee to be more evenly roasted than can be done in a cylindrical or spherical roaster. The thin layer of coffee is evenly spread over the surface exposed to the fire, and no part of it can be at any time very far removed from the heating-surface, and by exposing both sides alternately to the fire and slightly rocking it in either direction alternately a very even and regular brown is quickly imparted to the berry.

It is a matter of much importance that coffee be evenly roasted, and the quicker it is roasted consistent with such evenness the better is the flavor of the beverage. My invention secures both these advantages in a more perfect manner than any apparatus heretofore known to me.

My apparatus also is applicable to the purpose of a griddle for baking cakes, allowing of their being readily and quickly turned, and the smoke therefrom to be confined by the cover E.

My invention differs from the ordinary waffle-iron and the revolving gridiron, because neither of these can, by reason of their construction, be used for either of the purposes for which my invention is adapted. It also differs from the cylindrical and spherical coffee-roaster heretofore employed in the fact that it not only roasts the coffee much more evenly and quickly, but is also applicable to use as a griddle, for which they are not adapted. This capability of a double use renders my invention much more useful and valuable than any apparatus of a similar nature adapted to one object only.

Having now fully described my invention, what I claim as new therein, and desire to secure by Letters Patent, is—

The combined coffee-roaster and revolving griddle herein described, consisting of the two flat shallow vessels B C, in combination with the trunnions and frame A, so arranged as to admit of being opened and of rotating, substantially in the manner and for the purpose above set forth.

In testimony whereof I have hereunto subscribed my name in presence of two subscribing witnesses.

THOS. JOYCE.

Witnesses:
G. H. BABCOCK,
HENRY B. RYDER.